United States Patent
Teige et al.

(10) Patent No.: US 8,631,661 B2
(45) Date of Patent: Jan. 21, 2014

(54) ENERGY RECOVERY ENHANCED CONDENSER REACTIVATED DESICCANT REFRIGERANT DEHUMIDIFIER

(75) Inventors: Peter Teige, Universal City, TX (US); Michael Hayes, Atlanta, GA (US)

(73) Assignee: Munters Corporation, Amesbury, MA (US)

( * ) Notice: Subject to any disclaimer, the term of this patent is extended or adjusted under 35 U.S.C. 154(b) by 565 days.

(21) Appl. No.: 12/745,433

(22) PCT Filed: Feb. 13, 2009

(86) PCT No.: PCT/US2009/033988
§ 371 (c)(1),
(2), (4) Date: Aug. 6, 2010

(87) PCT Pub. No.: WO2009/102910
PCT Pub. Date: Aug. 20, 2009

(65) Prior Publication Data
US 2010/0307175 A1    Dec. 9, 2010

Related U.S. Application Data

(60) Provisional application No. 61/028,693, filed on Feb. 14, 2008.

(51) Int. Cl.
*F25D 17/06* (2006.01)
(52) U.S. Cl.
USPC .................................. 62/94; 62/271; 62/515
(58) Field of Classification Search
USPC ........... 62/94, 90, 271, 481, 515; 96/125, 126
See application file for complete search history.

(56) References Cited

U.S. PATENT DOCUMENTS

| 4,180,985 | A |   | 1/1980 | Northrup |   |
|---|---|---|---|---|---|
| 4,474,021 | A |   | 10/1984 | Harband |   |
| 5,791,153 | A | * | 8/1998 | Belding et al. | 62/93 |
| 5,826,434 | A | * | 10/1998 | Belding et al. | 62/90 |
| 5,931,016 | A | * | 8/1999 | Yoho, Sr. | 62/271 |
| 5,943,874 | A | * | 8/1999 | Maeda | 62/271 |
| 6,003,327 | A | * | 12/1999 | Belding et al. | 62/271 |
| 6,018,953 | A | * | 2/2000 | Belding et al. | 62/94 |

(Continued)

FOREIGN PATENT DOCUMENTS

EP    191007    8/1986

*Primary Examiner* — Mohammad M Ali
(74) *Attorney, Agent, or Firm* — Fitzpatrick, Cella, Harper & Scinto

(57) ABSTRACT

A method and apparatus for conditioning ambient air for use in an enclosure is disclosed which cools the ambient supply air stream in sensible energy recovery device or cools and dehumidifies the ambient supply air stream in an enthalpy energy recovery device. The thus cooled air is then cooled by a cooling coil of a refrigerant cooling system to reduce its temperature and humidity. The thus cooled and dehumidified air is then passed through a segment of a rotating desiccant wheel or through a different type of desiccant dehumidification device under conditions which reduce its moisture content and increases its temperature. The supply air is then delivered from the desiccant wheel to the enclosure. The desiccant wheel is regenerated by heating a separate regeneration air stream, provided by the exhaust air from the space and using the condensing coil of the refrigerant system to increase the regeneration air stream temperature. The thus heated regeneration air stream is then passed through another segment of the rotating desiccant wheel to regenerate the wheel and is exhausted to the atmosphere.

46 Claims, 16 Drawing Sheets

(56) References Cited

U.S. PATENT DOCUMENTS

| | | | |
|---|---|---|---|
| 6,029,462 A * | 2/2000 | Denniston | 62/94 |
| 6,029,467 A * | 2/2000 | Moratalla | 62/271 |
| 6,094,835 A * | 8/2000 | Cromer | 34/80 |
| 6,141,979 A * | 11/2000 | Dunlap | 62/176.6 |
| 6,915,655 B2 * | 7/2005 | Lee et al. | 62/271 |
| 6,918,263 B2 * | 7/2005 | Lee et al. | 62/271 |
| 7,047,751 B2 * | 5/2006 | Dinnage et al. | 62/94 |

* cited by examiner

ENERGY RECOVERY ENHANCED CONDENSER REACTIVATED DESICCANT REFRIGERANT DEHUMIDIFIER

This application claims the benefit of U.S. Provisional Patent Application No. 61/028,693, filed Feb. 14, 2008, which is incorporated herein by reference in its entirety.

BACKGROUND OF THE INVENTION

Field of the Invention

The present invention relates to air conditioning and dehumidification equipment, and more particularly to an air conditioning method and apparatus using desiccant dehumidification technology.

It is well known that traditional cooling coil based air conditioning systems do not provide efficient means of dehumidification. Because such systems must provide cooling in order to provide dehumidification, in many cases the cooling is in excess of what is required and the desired enclosure or space is over cooled. If insufficient cooling is supplied the space to be cooled will be under dehumidified. To overcome this problem, reheat coils have been used downstream of the dehumidifying cooling coil. This allows the cooling coil to dehumidify as needed and the reheat coil to then raise the supply air temperature to avoid supplying over cooled air to the enclosure. This method is inefficient because energy is utilized to lower the air temperature and then more energy is utilized to raise the temperature back up.

Due to their inefficiency ASHRAE standard 62-1989 has precluded the use of reheat devices in air conditioning systems unless the heat is recovered from the site. In addition, ASHRAE standard 62-1989 requires that systems with larger air flows must use some form of exhaust energy recovery to minimize the amount of energy used to condition outside air being introduced to the space.

A number of commercially available systems have been developed that combine energy recovery, pre-treatment, with cooling coil dehumidification and site recovered reheat. One such system is shown in FIG. 1 wherein an energy recovery ventilator with a packaged DX cooling and condenser reheat system is illustrated. An energy recovery ventilator generally consists of an enthalpy wheel of known construction which transfers both heat and sensible energy between two air streams. Enthalpy wheels are commonly used to transfer outgoing temperature and humidity (energy) to incoming ambient air. These energy exchangers are generally made of porous materials to increase surface area which aids in energy transfer. Other forms of energy transfer systems, such as heat pipes, can also be used.

In the system shown in FIG. 1, a fresh or outdoor supply of air (ambient air) is passed through a segment of the energy recovery device (in this case an enthalpy wheel) to reduce the supply air's humidity and temperature. The supply air is then passed through an evaporator/cooling coil of a conventional refrigeration system to reduce its humidity and temperature further. The dehumidified and cooled air is then passed through the condenser coil of the refrigeration system to raise the supply air temperature. The thus dehumidified and warm air is then supplied through a duct system directly to the desired space.

In the FIG. 1 system, exhaust air is drawn from the space with a fan or blower (not shown) and passed through a separate segment of the enthalpy wheel energy recovery device. As a result the temperature and humidity of the exhaust air stream is increased and then the exhaust is rejected to the atmosphere. This type of prior art device is effective in reducing the moisture in the supply air and utilizes energy recovery, but requires significant cooling to obtain the desired dehumidification performance. Much of the energy utilized to cool the air to obtain this dehumidification is reversed through the heating coil to eliminate over cooling of the space.

FIG. 2 is a psychrometric diagram of the system in FIG. 1 and provides the psychrometric analysis of the effects of each component of the system on the supply air.

In this illustrative system the ambient or outside air (OA) has a humidity ratio of about 100 gr/lb and a temperature of about 94° F.; after leaving the energy recovery wheel it has a humidity ratio of about 80 gr/lb and a temperature of about 83° F.; after passing through the evaporator coil it has a humidity ratio of about 59 grab and temperature of about 53° F. and, after leaving the condenser coil has the same humidity ratio, about 59 grab and a temperature of about 72° F.

Another form of condenser regenerated conditioning system is shown in FIG. 3 and also in FIG. 7 of U.S. Pat. No. 6,557,365 B2. That system uses a DX cooling coil to cool and dehumidify ambient/outside air prior to entering a desiccant wheel. The air is then dehumidified further and heated with the desiccant wheel before being supplied to the space. A separate ambient air stream is used as the regeneration air stream and is first heated utilizing condenser heat from the DX refrigeration cycle; the thus heated air stream is then used to drive moisture off of the desiccant wheel. The regeneration air stream collects the moisture and rejects it to the atmosphere. Many other desiccant dehumidification systems are commercially available that utilize other sources of heat to regenerate desiccant wheels to provide dehumidification and heating cycles to supply air. The vast majority of these devices require high regeneration temperatures to regenerate the desiccant.

FIG. 4 shows the psychrometric diagram for the system of FIG. 3 and shows the effect of the system components on the supply air system. As seen therein the outside air supplied to the evaporator coil has a temperature of about 93° F. and humidity ratio of about 100 gr/lb. After leaving the evaporator coil it has a temperature of about 62° and humidity ratio about 78 gr/lb. Upon leaving the desiccant wheel it has a temperature of about 72° F. and a humidity ratio of about 58 gr/lb.

FIG. 5 illustrates another prior art air conditioning system which, in this case, uses a condenser regenerated desiccant system with enthalpy recovery pre-treatment of the supply air. As seen therein, fresh outdoor ambient supply air is passed through a sector of an enthalpy recovery device, dehumidified and cooled and then passed through the cooling coil of a conventional DX refrigeration system further reducing its humidity and temperature. The thus cooled and dried supply air stream is then passed through a desiccant device in which it is dehumidified, heated and thereafter supplied to the space via a duct system. Exhaust air is drawn from the space with a fan or blower (not shown) and passed through another section of the enthalpy recovery device in which the exhaust air is heated and humidified and then rejected to the atmosphere. In this system, a separate air stream from the ambient is heated utilizing the condenser coil from the refrigeration system and is then used as the regeneration air stream. The regeneration air stream is passed through another section of the desiccant device, cooled and humidified, and then rejected to the atmosphere.

FIG. 6 shows the psychrometric diagram of the system of FIG. 5 and shows the effects of each component of the system on the supply air. As seen therein, the outside supply air initially has a humidity ratio of about 100 gr/lb and temperature of about 93° F.; after passing through the enthalpy wheel the supply air has a humidity ratio of about 84 gr/lb and a temperature of about 84° F. After passing through the evaporator coil it has a humidity ratio of about 78 gr/lb and a temperature of about 62° F. After passing through the desiccant wheel it has a humidity ratio of about 58 gr/lb and temperature of about 72° F. as it is supplied to the space.

SUMMARY OF THE INVENTION

As compared to conventional air conditioning systems and processes as described above the present invention has significant advantages in treating fresh or outdoor air to supply that air at space temperature and at or below space humidity. The most significant advantage is low energy consumption. More specifically, the present invention reduces the required energy input from 30 to 75% as compared to the other techniques available.

An additional significant benefit of the invention is the ability to provide lower supply air humidity conditions (dew point or gr/lb (absolute humidity ratio)) than some other techniques. More particularly, coil based dehumidifier systems have problems with ice forming on the evaporator coils as they provide lower coil temperatures in order to provide lower humidity conditions. The present invention on the other hand provides the ability to provide lower supply air humidity conditions (dew point or gr/lb) by utilizing a desiccant based dehumidification cycle after the cooling coil.

It is an object of the present invention to treat outdoor or fresh, ambient supply air and dehumidify and cool that air from the outdoor ambient condition to the desired space air condition. ASHRAE has defined the comfort conditions for a building to be between 73° F. and 78° F. temperature and about 50% relative humidity or 55 gr/lb of air to 71 gr/lb of air. In particular the present invention is particularly suited to treat hot and humid air in the southeastern United States and other hot and humid climates around the world with ambient air conditions ranging from 60° F. to 105° F. or more and a moisture content of 70 to 180 gr/lb and deliver the treated air to the space temperature, and at or below the space humidity, generally in the range of about 70° F. to 85° F. and a moisture level of about 45 to about 71 gr/lb. Ranges somewhat lower and higher than those proposed by ASHRAE can also be achieved by this invention when design space conditions vary from stated ASHRAE conditions.

Another object of the present invention is to provide such treatment of outdoor, fresh, ambient air very efficiently with lower energy input than most treatments systems currently available.

Yet another object of the present invention is to provide a system that can provide varying capacity of dehumidification and cooling to react to and overcome varying cooling and dehumidification loads of the fresh or outdoor supply air and/or the building itself.

A further object of the present invention is to provide heating to the outdoor or fresh supply air with the use of an energy recovery device during cold weather periods to lower the heating input requirement to heat air to the space temperature condition. More specifically, the system utilizes exhaust air with heat transferred to fresh or outdoor supply air with an energy recovery heat exchanger to substantially increase the temperature and/or the humidity of the air prior to being heated by a heating device. Thus, a temperature as such as −10° F. would be heated to approximately a temperature of 50° F. or higher as needed.

In accordance with one aspect of the invention an air conditioning system includes a means for recovering energy from an exhaust air stream by passing the exhaust air stream across an energy recovery device such as an enthalpy wheel. Fresh, outdoor, ambient supply air is passed over the other "side" of the energy recovery device. The energy recovery device transfers energy from one air stream to the other without air transferring across the device. This allows for a reduction in temperature and, in some devices, reduction in humidity in the supply air when the ambient condition is warmer and more humid than the space condition. It also allows for the increase in temperature and, in some devices, the increase of humidity in the supply air when the ambient condition is colder and dryer than the space condition.

In accordance with another aspect of the invention the system of the present invention utilizes a cooling coil to lower the temperature and humidity of the supply air before supplying it to the space at which it is required. A desiccant dehumidification device that utilizes reactivation heat from a refrigeration system provides additional dehumidification while increasing the temperature of the supply air. Additional cooling of the air is an option to provide lower temperature supply air and overcome internal building sensible load if desired.

Systems according to the present invention can also utilize the exhaust air that has passed through an energy recovery device to provide the reactivation air source for the desiccant dehumidification cycle. A condenser coil from a conventional refrigeration system is utilized to increase the temperature of the exhaust air and then passes this air through another segment of the desiccant device to provide regeneration of the desiccant device. The exhaust air stream is cooled and humidified during this regeneration process and allows it to be passed through an additional condenser coil to receive additional heat rejected from the refrigeration system. An evaporate cooling device can also be added prior to the second condenser coil to lower the exhaust air entering the second condenser coil to improve the refrigeration systems efficiency and/or increase the capacity of the heat rejection of the condenser.

The above, and other objects, features and advantages of the present invention will be apparent in the following detailed description of illustrative embodiments thereof which is to be read in connection with the accompanying drawings, wherein:

DETAILED DESCRIPTION

Figure 7:
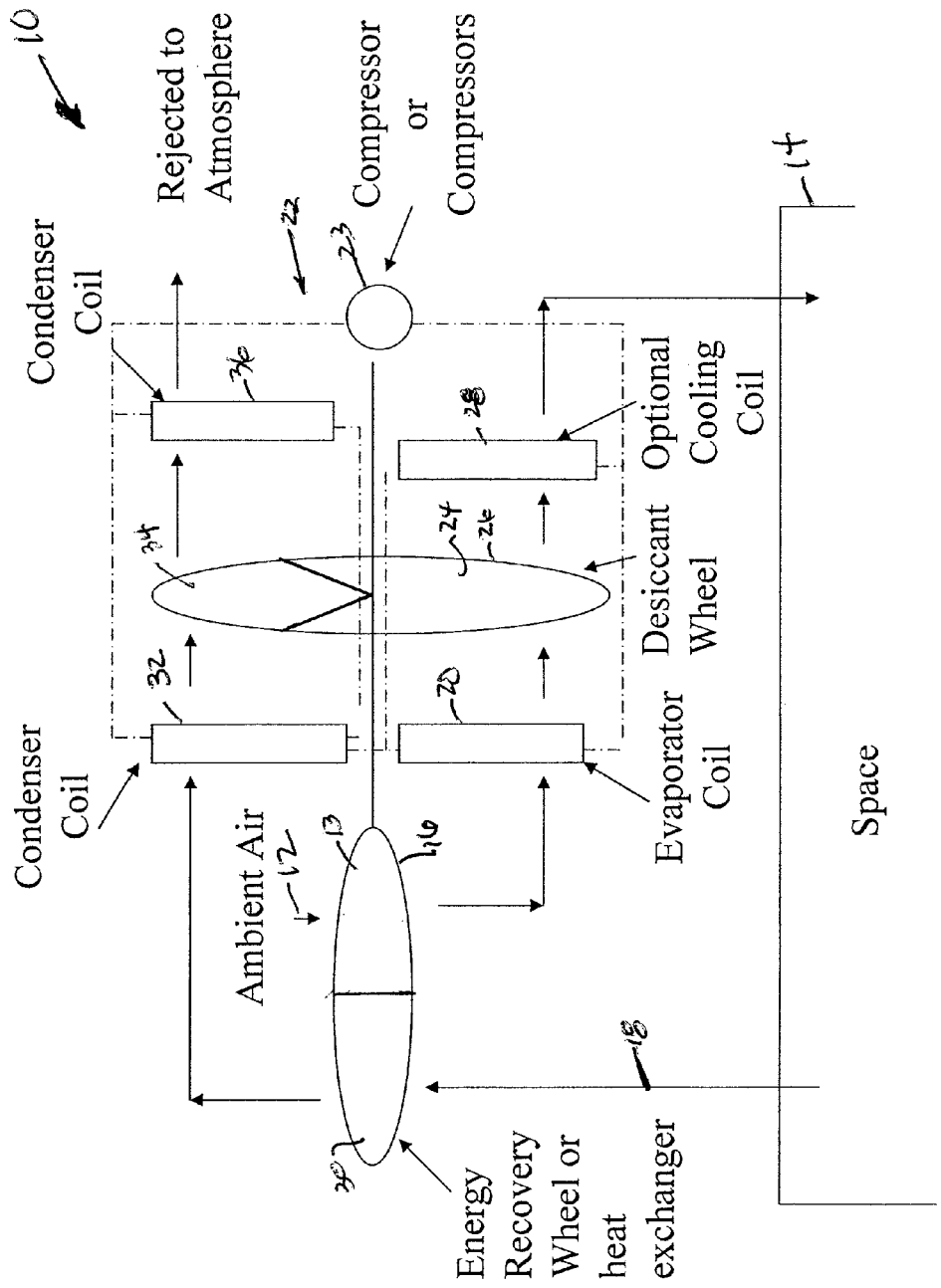
FIG. 7 is a schematic view of an air conditioning system according to the present invention.

Referring now to the drawing in detail and initially to FIG. 7, an air conditioning system 10 according to one embodiment of the invention is illustrated in which a stream of ambient air 12 is treated to desired temperature and humidity conditions for use in a room, enclosure or space 14. In the illustrative embodiment, the system is used in areas where the ambient outside air has a high temperature and high humidity content or ratio as described above. FIG. 7 is a schematic drawing and it will be understood by those skilled in the art that the described air streams are contained in appropriate duct work and moved with appropriate fans, which are not illustrated.

As seen in FIG. 7, fresh, outdoor, ambient supply air 12 is first passed through a section 13 of an energy recovery device 16. The air is cooled and dehumidified as it passes through the energy recovery device 16. As described above, this device may be a conventional rotating enthalpy wheel or other form of heat exchanger, such as a heat pipe, to exchange heat between the supply air stream 12 and an exhaust air stream 18 drawn from space 14. In the case of using a heat pipe the ambient air will be cooled but not dehumidified.

The cooled and dehumidified supply air stream is then passed through the cooling or evaporator coil 20 of a conventional DX refrigerant unit 22, which includes a compressor 23, to further reduce its temperature and humidity. The supply air then passes through a segment of a desiccant device 26, such as a conventional silica coated rotating corrugated desiccant wheel, to further reduce its humidity while increasing its temperature. At this point the supply air is at or close to the desired temperature in space 14 and is equal to or below the desired humidity in that space.

When the supply air on leaving desiccant wheel 26 has a humidity ratio less than that desired in space 14 the supply air will provide dehumidification capacity to the space to overcome internal latent load. The supply air can be directly supplied to the space at that point or it can be further cooled using an optional cooling or evaporator coil 28 between the desiccant wheel and space 14 to provide cooling effect to the space and overcome internal sensible load.

The exhaust air stream 18 is drawn from the space 14 with a fan or blower (not shown), and then passed over another section 30 of energy recovery device 16. The exhaust air is heated by the heat absorbed in section 13 and humidified as it passes through section 30 and then is passed through a condenser coil 32 of the refrigeration system 22 to increase its temperature. The exhaust air leaving condenser 32 is at a higher temperature than when it entered and is then utilized to regenerate the desiccant of wheel 26 by passing the exhaust air through a separate section 34 of the desiccant device. The exhaust air stream is cooled and humidified during this regeneration process. The now cooler exhaust air can then be used to pass over a second condenser coil 36 in system 22 to recover still more from the refrigeration system and then is rejected to the atmosphere.

As will be appreciated by those skilled in the art the system of the present invention utilizes the exhaust air stream to recover heat from the ambient supply air stream and to regenerate the desiccant wheel. It is also used to recover or absorb heat from the refrigeration system through the condensers 32 and/or 36. This heat rejection potential of the exhaust air stream is increased by the evaporative cooling effect in the desiccant regeneration process. This exhaust/regeneration air stream 18 can be equal to or less than the supply air stream in volume, as desired, using appropriate controls. This is an important aspect as it is well known that prudent air conditioning design calls for positive air pressure in a building. To obtain positive air pressure, the fresh or outdoor supply air quantity must be equal to or larger than the exhaust air quantity.

Figure 1:
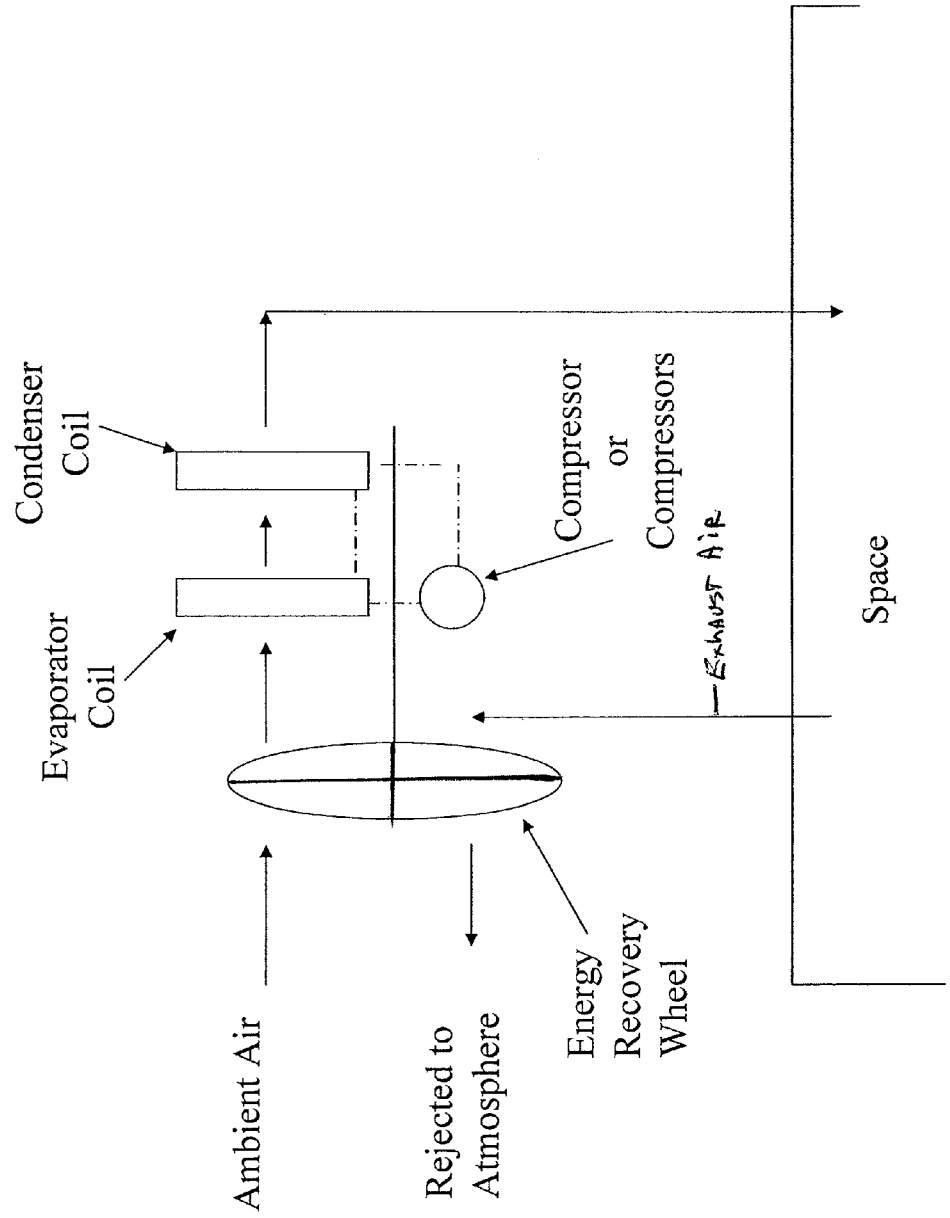
FIG. 1 is a schematic diagram of a conventional prior art energy recovery air conditioning or ventilator, using a DX cooling and condenser reheat system.
Figure 2:
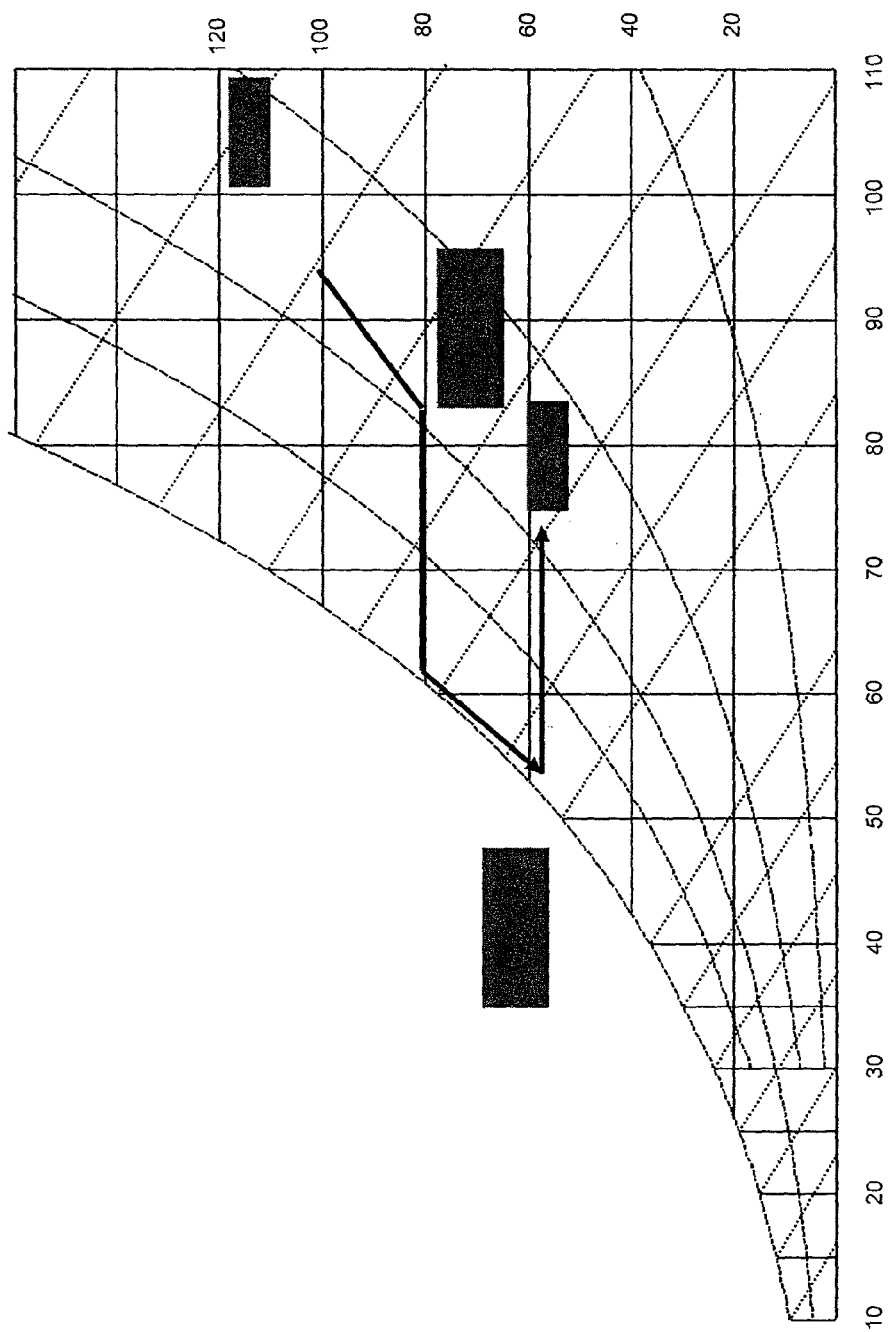
FIG. 2 is a psychrometric chart describing the effects of the components of the system on the supply air stream of the system shown in FIG. 1.
Figure 3:
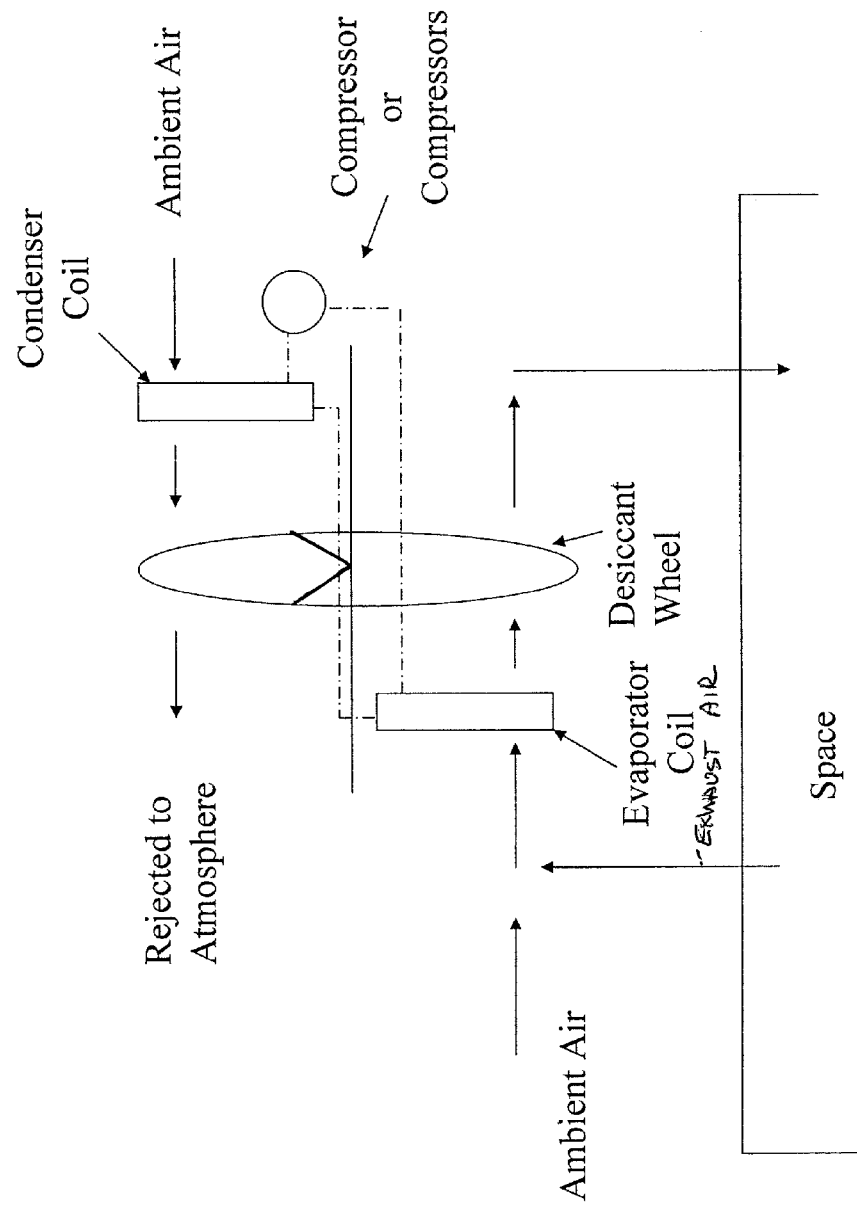
FIG. 3 is a schematic diagram of a prior art condenser reactivated desiccant system.
Figure 4:
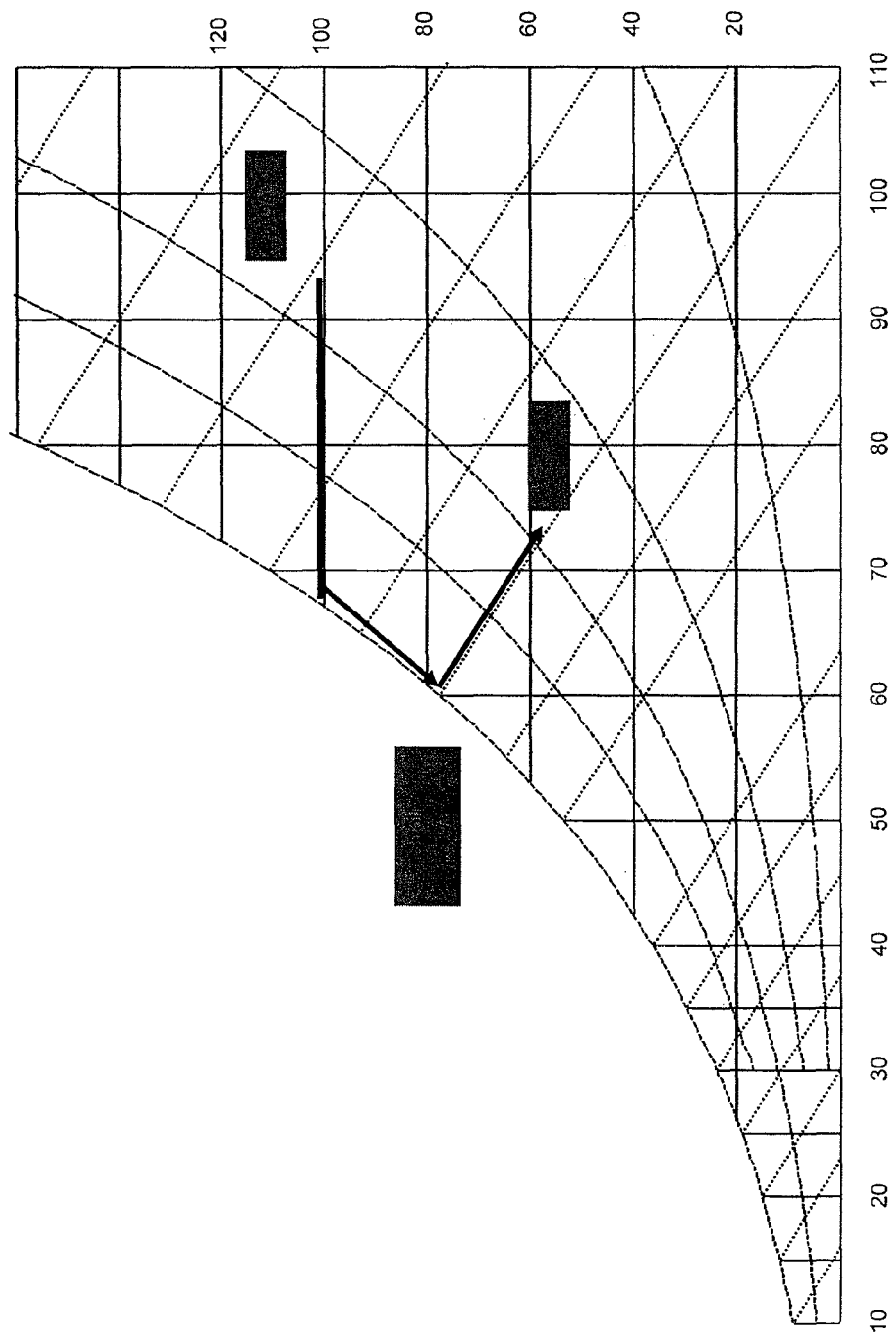
FIG. 4 is a psychrometric chart describing the effects of the system components on the supply air stream of the system shown in FIG. 3.
Figure 5:
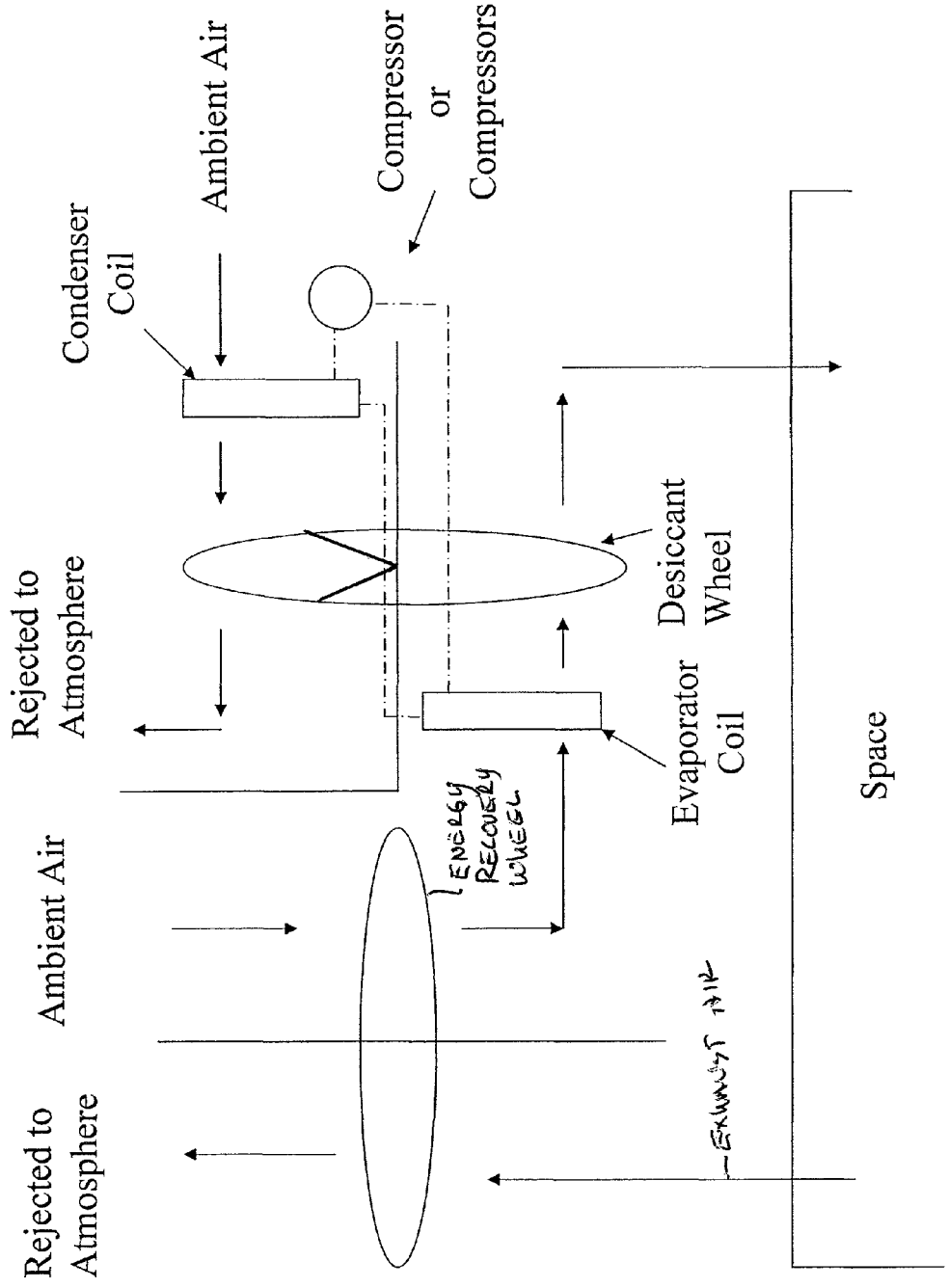
FIG. 5 is a schematic diagram of a prior art condenser reactivated desiccant system using an enthalpy energy recovery pre-treatment system.
Figure 6:
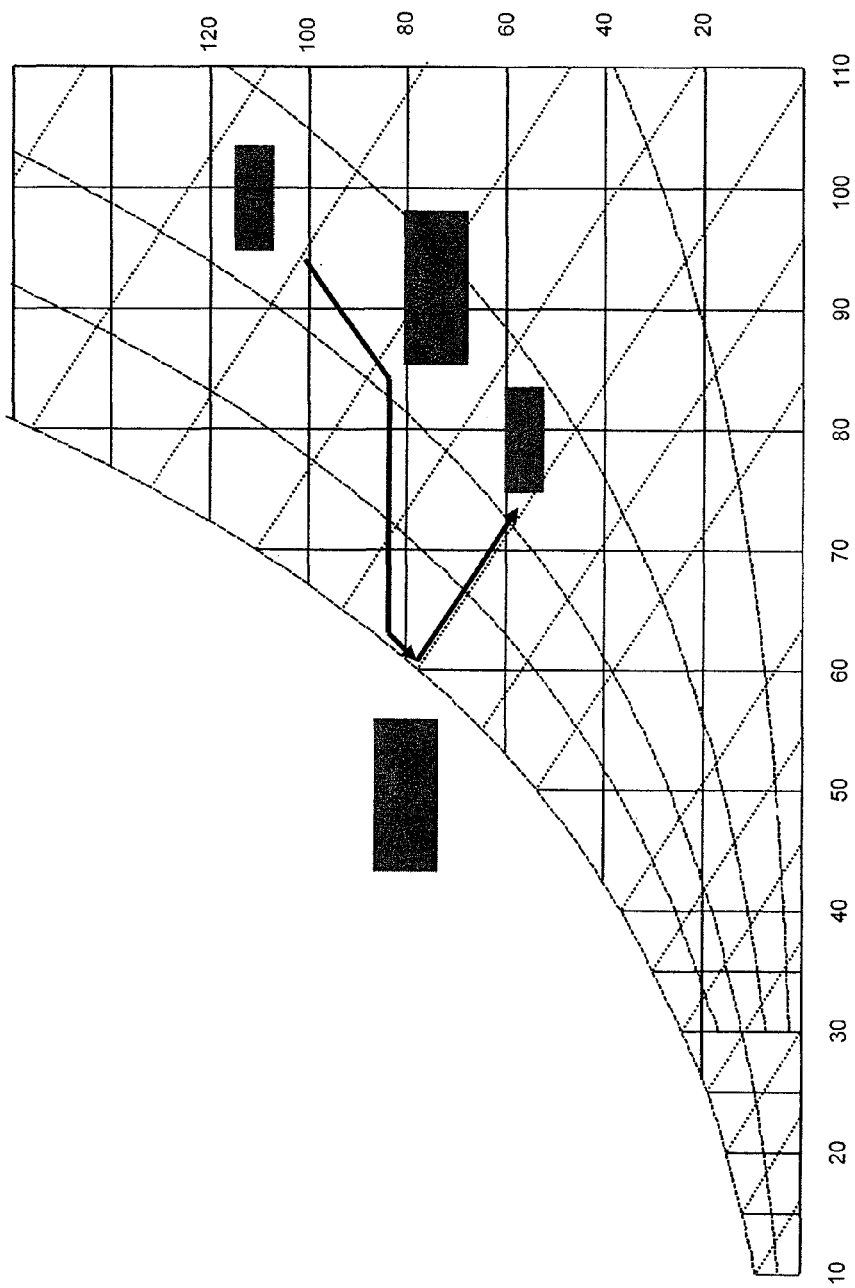
FIG. 6 is a psychrometric chart describing the effects of the system components on the supply air stream shown in FIG. 5.
Figure 8:
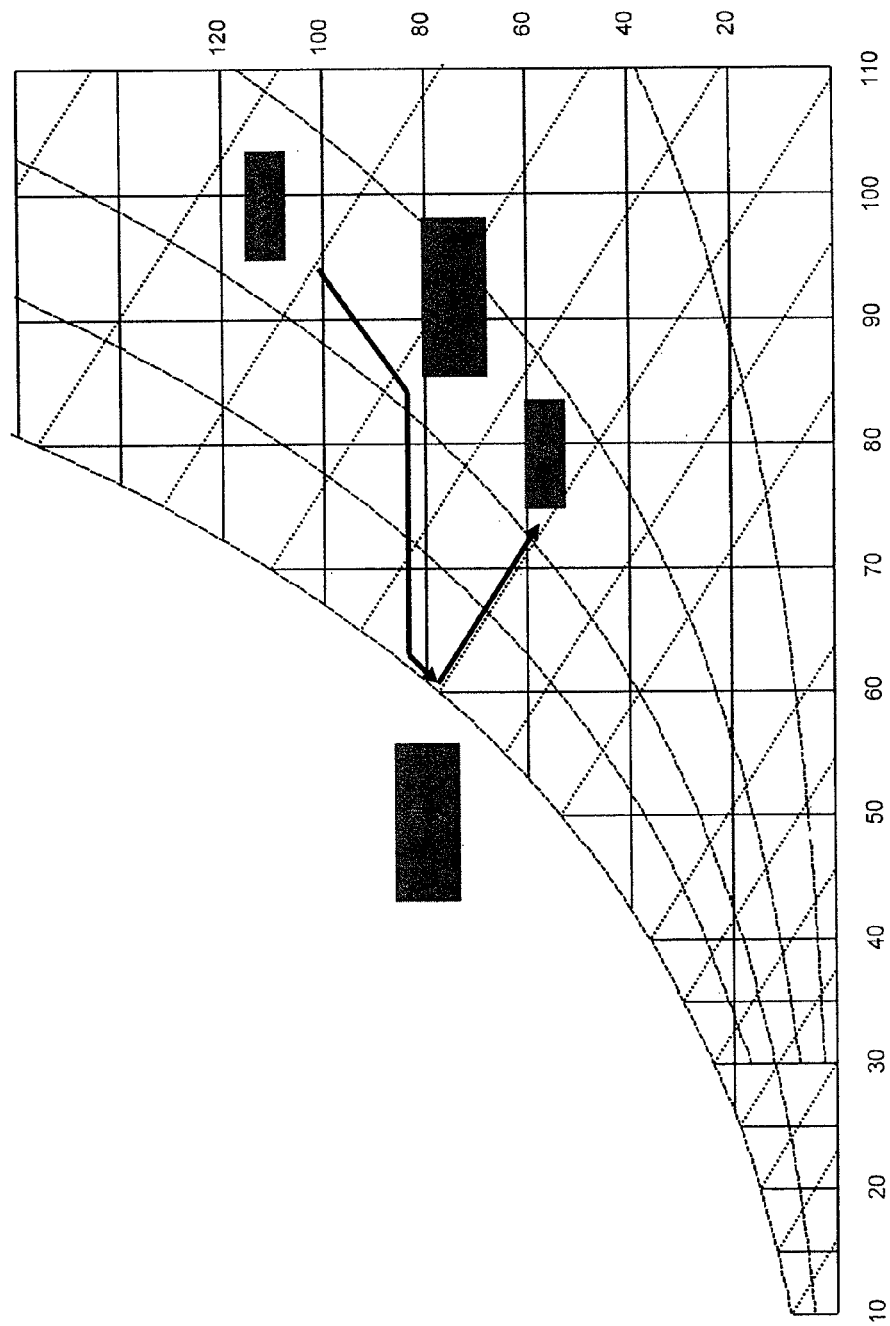
FIG. 8 is a psychrometric chart showing the effects of the components on the supply air stream in the system shown in FIG. 7.
Figure 9:
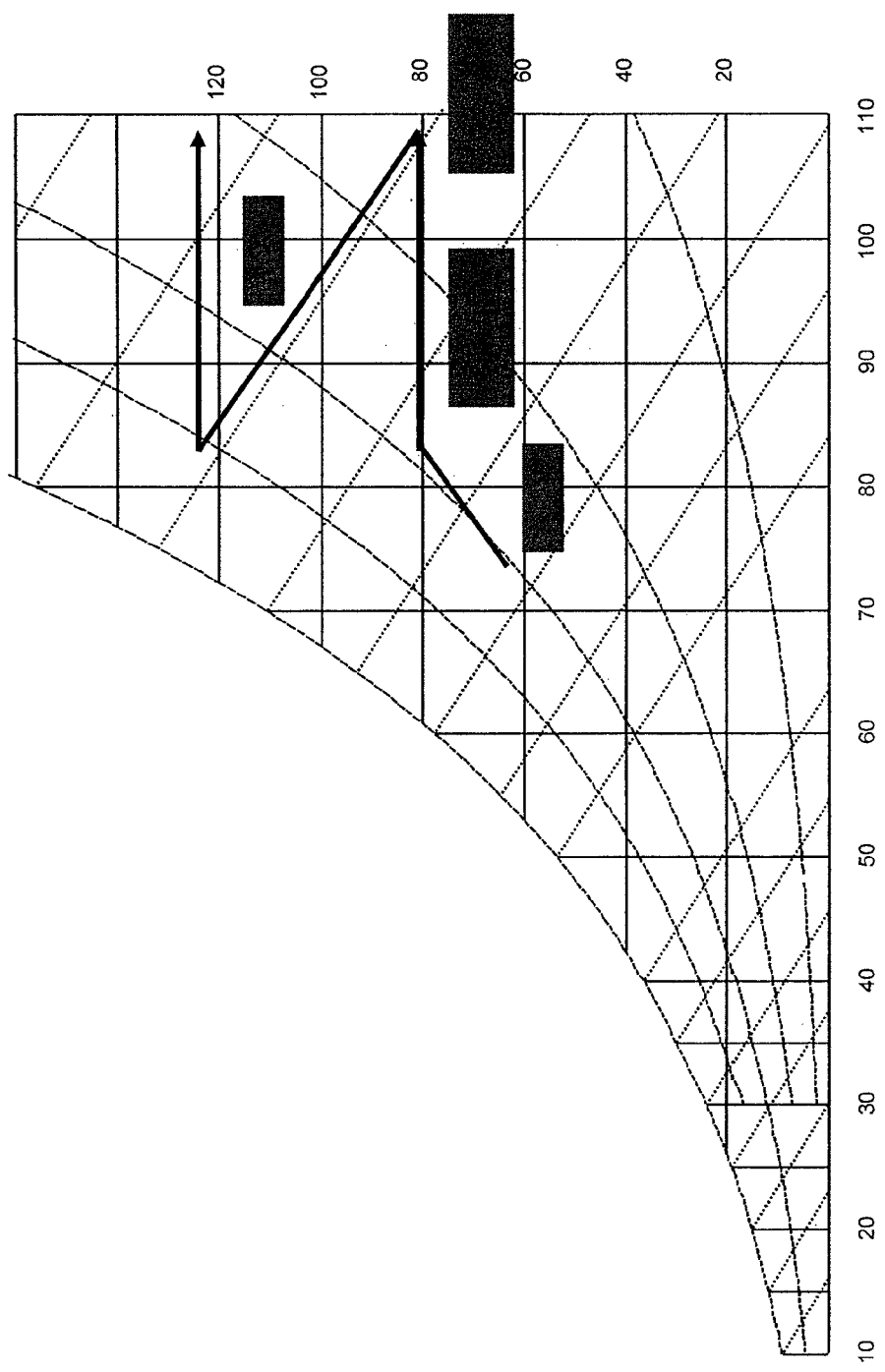
FIG. 9 is a psychrometric chart showing the effects of the components on the exhaust air stream in the system shown in FIG. 7.

FIG. 8 is a psychrometric chart which shows the effect of the components of the invention illustrated in FIG. 7 on the supply air stream 12. As seen therein the effects are similar to those achieved in the prior art device of FIG. 5, although the present invention allows for the inclusion of an additional cooling coil 28 for treating the supply air stream after it leaves the desiccant wheel 26. However, unlike the FIG. 5 system the present invention recaptures heat wasted in the exhaust air stream of the FIG. 5 system. Thus, the exhaust air stream leaving space 14 and entering segment 30 of enthalpy wheel 16 has a temperature of about 72° F. and a humidity ratio of about 64 gr/lb, on leaving the enthalpy wheel it has a temperature of about 83° F. and a humidity ratio of 80 gr/lb. As it passes through the condenser coil 32 the exhaust air stream absorbs the heat rejected from the coil so that when it leaves the coil and enters the regeneration segment 34 of the desiccant wheel it has a temperature of about 108° F. and humidity ratio of 80 gr/lb. After passing through the desiccant wheel segment 34 and before entering the condenser coil 36 the exhaust air stream has a temperature of about 80° F. and a humidity ratio of about 122 gr/lb. When passing through condenser coil 36 it absorbs heat rejected by that coil and its temperature rises to about 108° F. or more before being discharged to the atmosphere.

Figure 10:
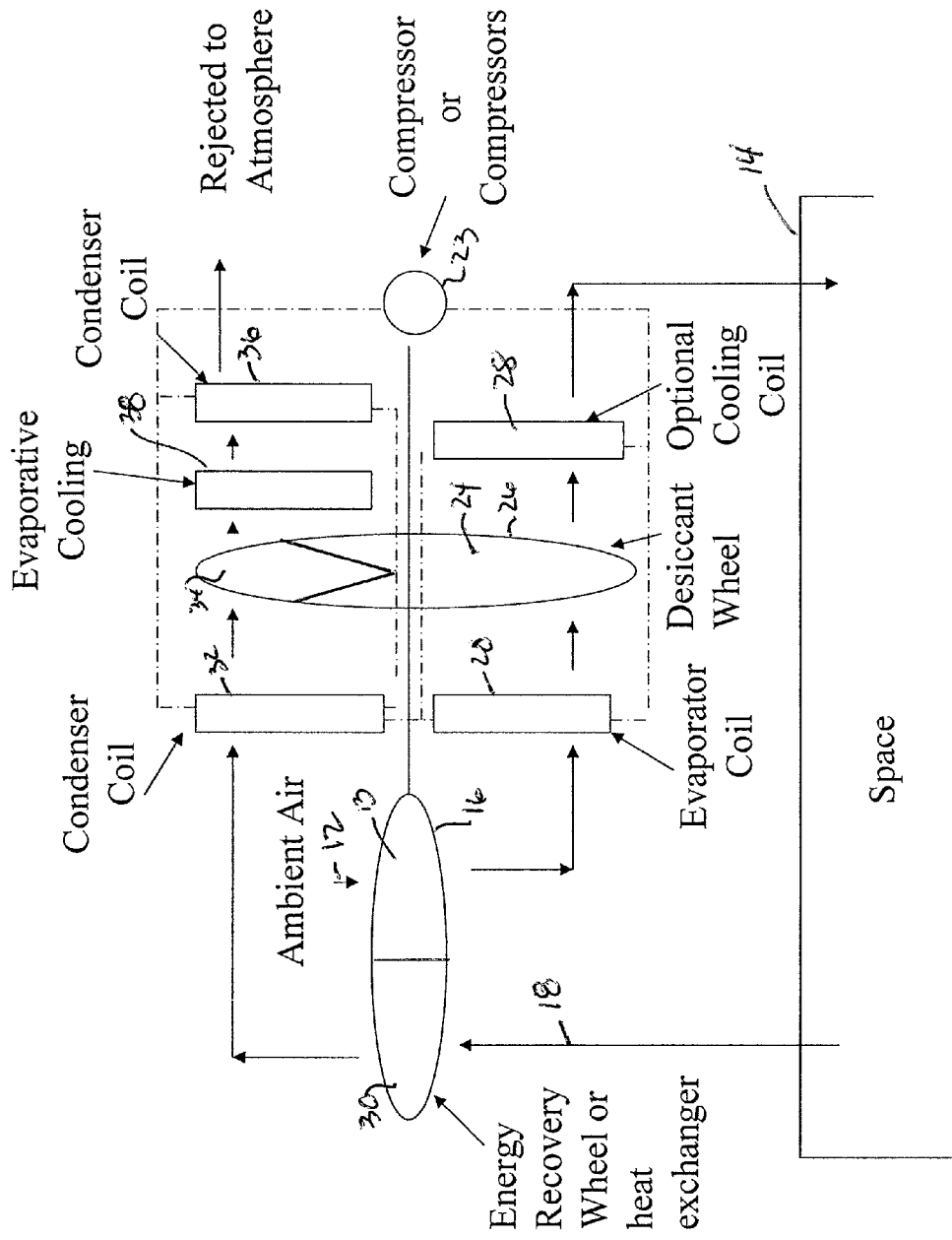
FIG. 10 is a schematic illustration of a second embodiment of the present invention.

FIG. 10 illustrates another embodiment of the invention shown in FIG. 7 and the same reference numerals are used to identify like parts. In this embodiment an evaporative cooling device 38 is added between desiccant wheel 26 and the second condenser coil 36 in the exhaust air stream. The evaporative cooling device may be of conventional construction using, for example, cross corrugated sheet materials of known construction through which a supply of water is passed cross or countercurrent to the air steam to cool the air stream. This additional evaporative cooling of the exhaust air stream further lowers its temperature. The exhaust stream at that lower temperature has additional heat rejection capacity when it enters condenser coil 36 and thus allows for lower and more efficient condenser temperatures and lower refrigerant head pressure.

Figure 11:
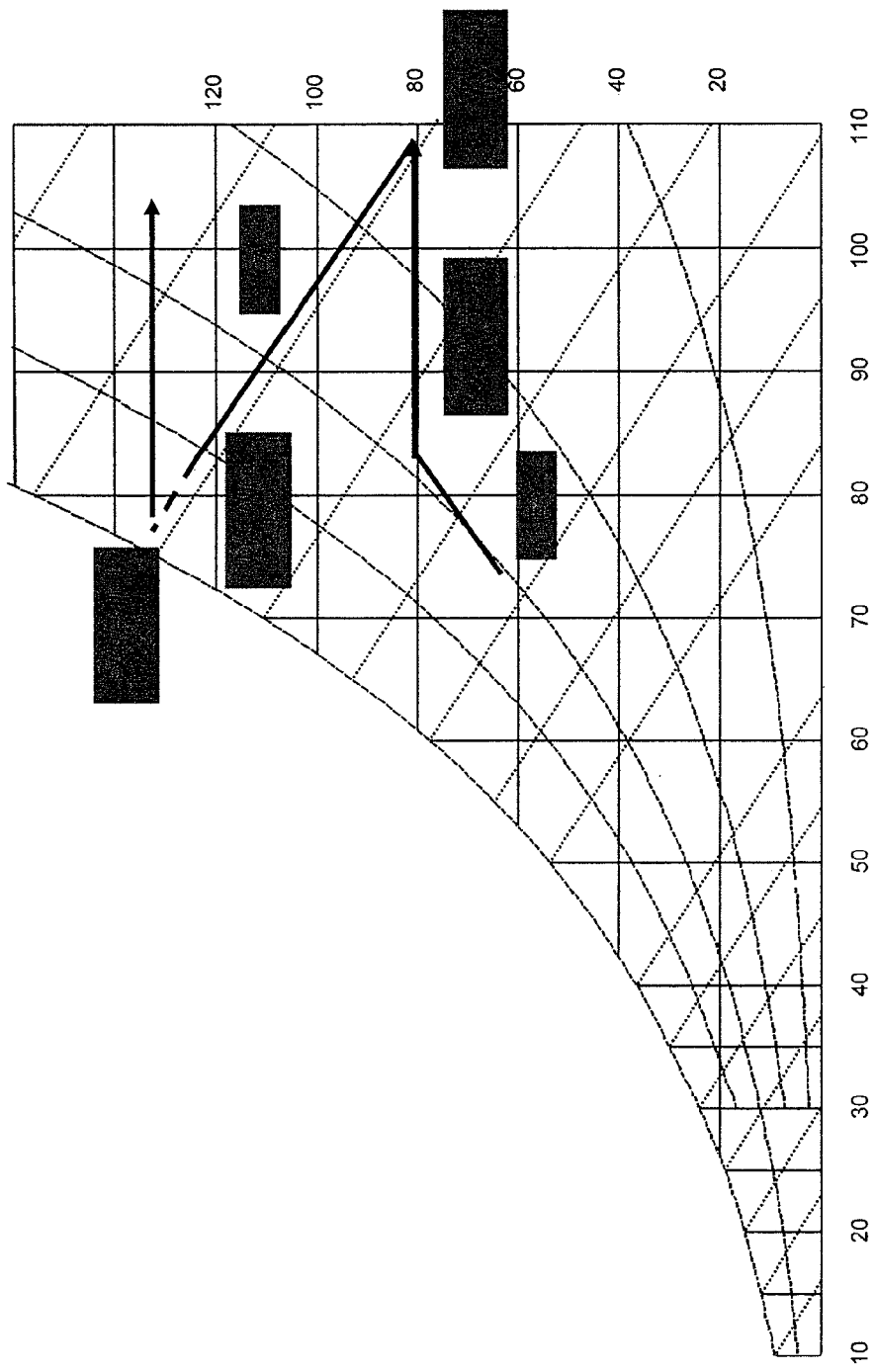
FIG. 11 is a psychrometric chart showing the effects of the components on the exhaust air stream in the system shown in FIG. 10.

FIG. 11 is a psychrometric chart showing the effects of the invention as illustrated in FIG. 10. As a result of the use of the evaporative cooling device added between the desiccant wheel 26 and second condenser 36 the exhaust air stream temperature is reduced further to about 77° F. and its humidity ratio increased to about 130 gr/lb to provide additional cooling and lower temperature upon entering the second condenser.

The present invention provides significant advantages over prior art. The use of a single air stream for exhaust, regeneration and condenser heat rejection significantly lowers the required fan horsepower (for moving various air streams) to accomplish these three tasks. While the system does require increased total static pressure to overcome the different heat exchangers, the total airflow is substantially reduced. As fan power is proportional to the square of the static pressure and the cube of the airflow, reduced airflow is a more important factor in reducing fan power requirements.

In addition, the use of a single air stream to provide these functions also provides lower humidity levels to the desiccant wheel for the reactivation process. Building exhaust air is taken from the space at space humidity. It then goes through an energy recovery device. This device either does not increase its humidity (when using a sensible heat recovery device) or it increases it some proportion between the outdoor condition and the indoor condition based on the efficiency of the enthalpy recovery device. In either case the humidity leaving the energy recovery device and entering the desiccant wheel is lower than the outdoor condition. The temperature of the exhaust air is at the same temperature regardless of humidity. The temperature is determined by the exhaust recovery process where temperature exchange is independent of humidity level and the added condenser heat, again independent of humidity. As the desiccant wheel acts as a relative humidity exchanger, a lower humidity condition in an air stream with determined temperature provides a lower relative humidity. Thus the lower humidity in the air gives the desiccant device increased capacity through enhanced regeneration.

Further advantages of the invention over the prior art are related to the refrigeration cycle condenser heat rejection capacity and temperature. Condenser heat must be rejected to the atmosphere. The temperature of the exhaust air stream of the present invention is lower than the ambient temperature. Just as with the humidity relationship, the exhaust air is taken from the space and run through an energy recovery device. Its temperature is increased at some fraction of the difference between the space temperature and the outdoor temperature. The leaving temperature is at some temperature lower than the outdoor ambient. This provides two benefits. First the airflow rate required to reject the heat from the condenser coil to the air stream is reduced due to its lower temperature and the greater difference between the refrigerant temperature entering the condenser and the air temperature entering the condenser. The reduced air flow requirement also lowers the fan horsepower requirement. It is to a certain extent included in the reduced air flow requirement discussed above. In addition, the lower entering air temperature to the condenser allows for a lower refrigeration temperature leaving the condenser and provides a lower head pressure. As the head pressure lowers, the amount of work the compressor must do to raise the pressure of the refrigerant is reduced allowing the compressor to operate with a lower power requirement.

Yet another enhancement of the present art is the ability and efficiency of the exhaust air stream to reject more heat in the second condenser. The evaporative cooling effect of the desiccant wheel lowers the temperature back to a temperature that allows the same air stream to perform more heat rejection. This again reduces total airflow and provides reduced fan horsepower. The addition of an evaporative cooling device before this second condenser further lowers that temperature to provide the same efficiency for the second condenser as discussed above for the first condenser. It gives the second condenser the ability to reject more heat to a smaller air stream and save fan power. It also lowers the temperature and reduces head pressure in the refrigerant circuit reducing compressor power.

In addition to the above further efficiencies can be achieved when a desiccant wheel is used as the desiccant device 26 since the speed of rotation of the wheel can be controlled to increase or decrease heating and dehumidification to control supply air steam temperature and humidity.

Figure 12:
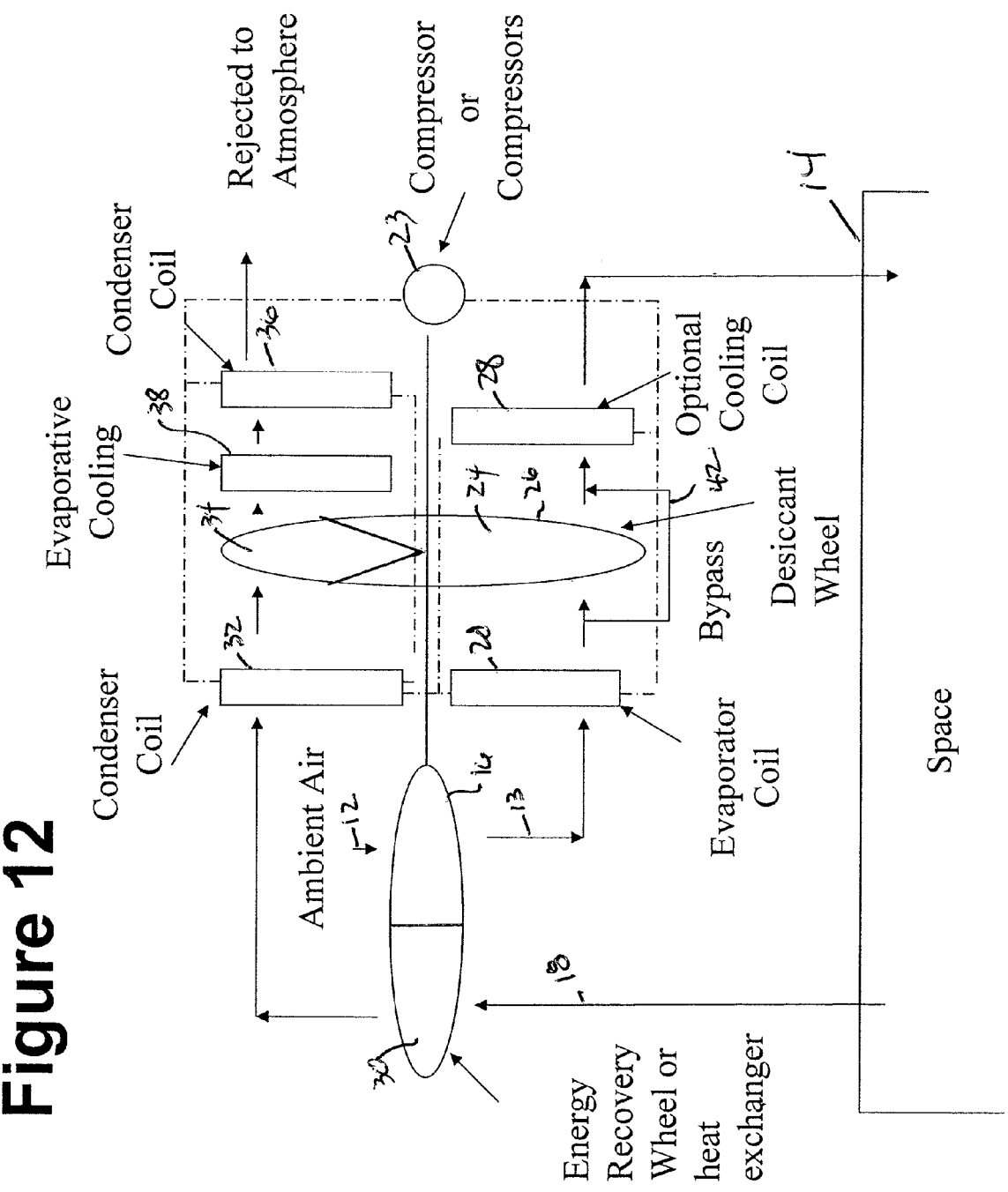
FIG. 12 is a schematic illustration of a third embodiment of the invention.
Figure 13:
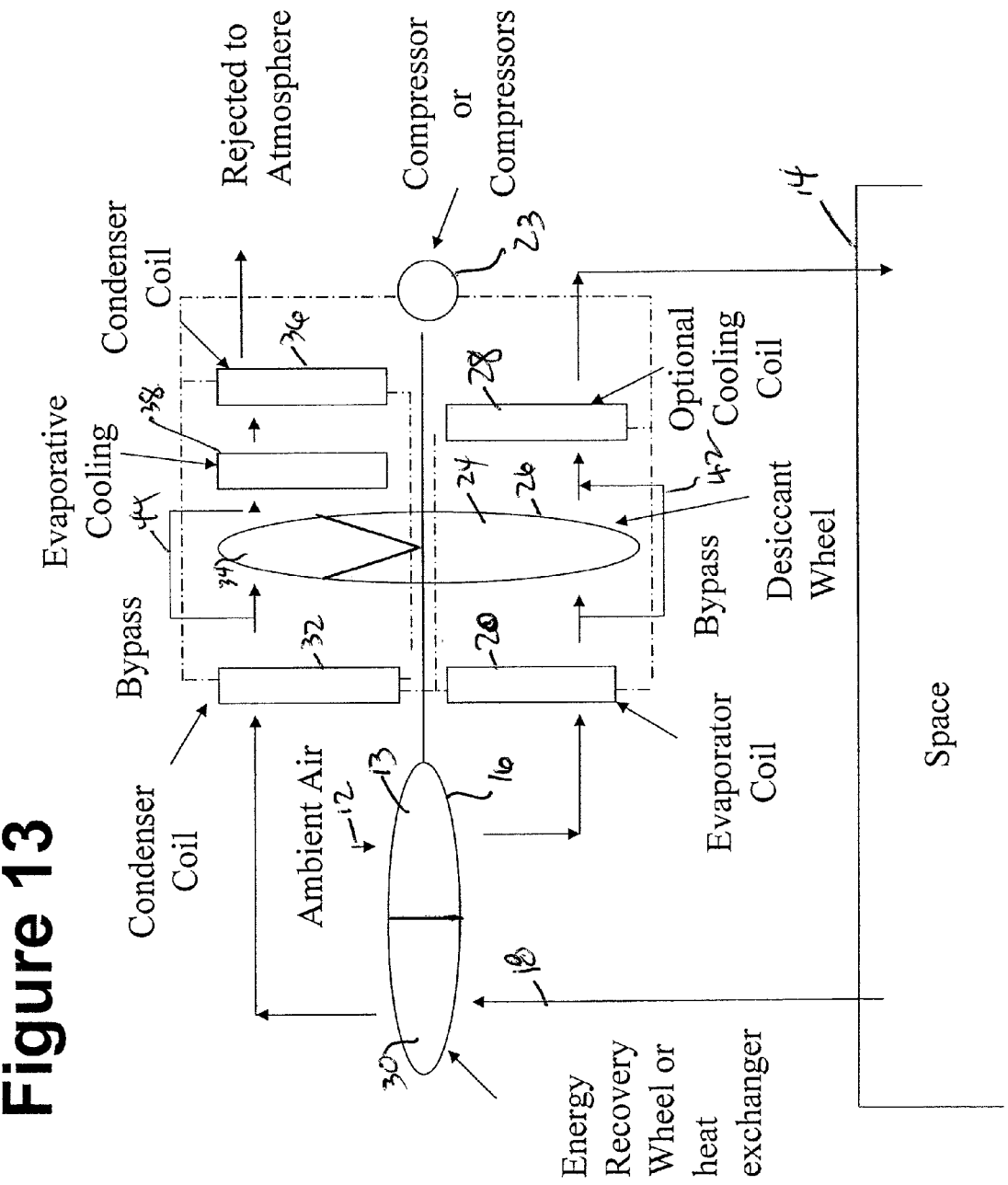
FIG. 13 is a schematic illustration of a fourth embodiment of the invention.
Figure 14:
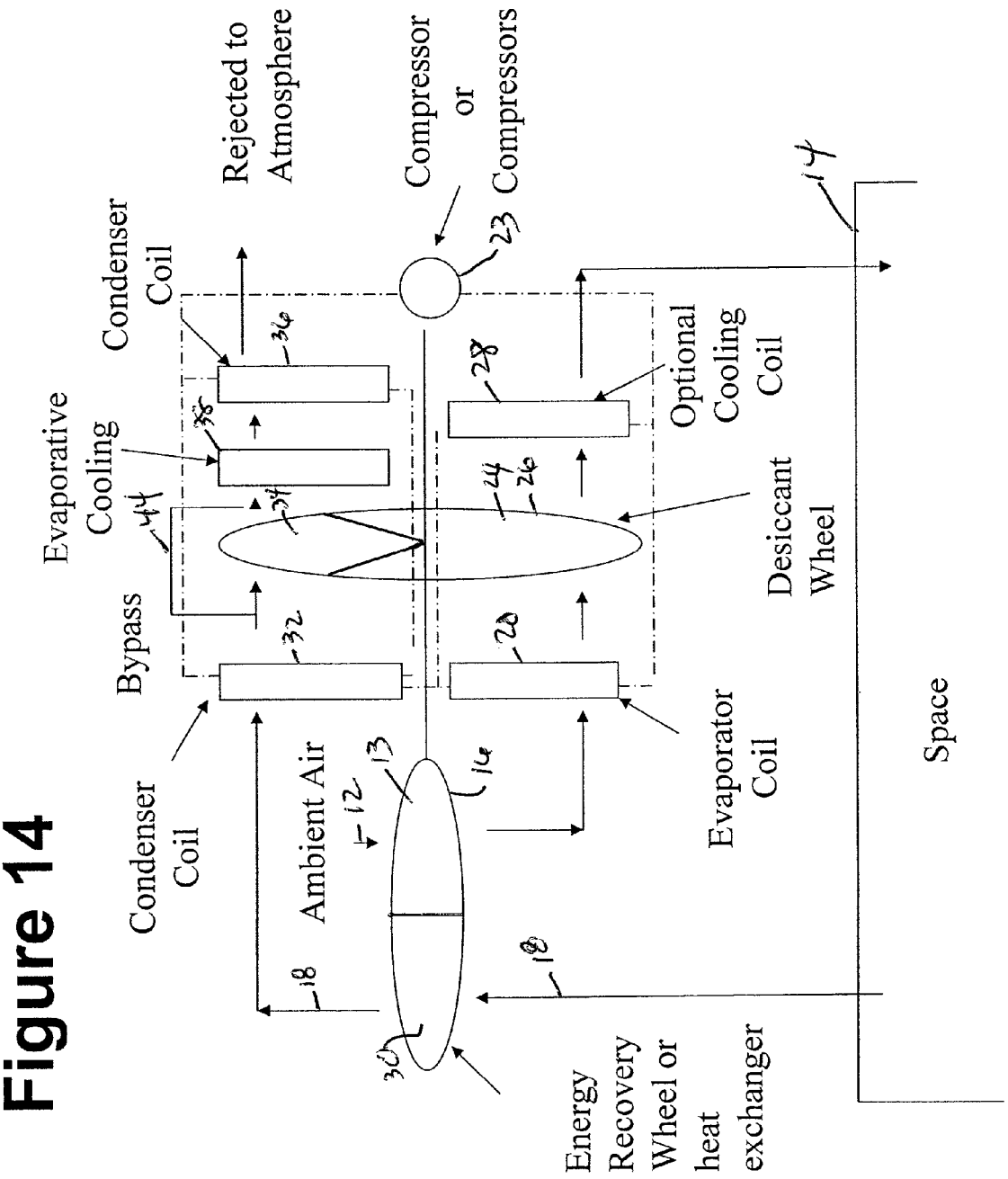
FIG. 14 is a schematic illustration of a fifth embodiment of the invention.

FIGS. 12-14 illustrate other embodiments of the invention as shown in FIG. 10, again using the same reference numerals for corresponding parts. In each embodiment one or more air stream bypasses are provided using conventional duct work, baffles and controls to selectively bypass a portion of one or both of the air streams around the desiccant wheel.

FIG. 12 illustrates the use of a bypass 42 to direct a portion of the supply air stream around the dehumidification section of desiccant wheel 26.

FIG. 13 illustrates the use of the bypass 42 along with a bypass 44 which bypasses a part of the exhaust air stream around the regeneration section 34 of the desiccant wheel.

FIG. 14 simply illustrates the use of the single bypass 44 at the regeneration section 34 of the desiccant wheel.

Providing one or more such bypasses around a desiccant wheel allows for several advantages. Modulating the bypass on either the supply or regeneration side provides capacity modulation of the desiccant effect on the supply air stream. In addition, the pressure drop of the desiccant wheel can be avoided during times when dehumidification is not required, allowing for reduced fan power requirements and more efficient operation. It also allows for greater flexibility in unit design, providing the ability for the unit to supply more air than the desiccant wheel can accommodate. This flexibility can lower the cost of the equipment to meet specific unit performance requirements.

Figure 15:
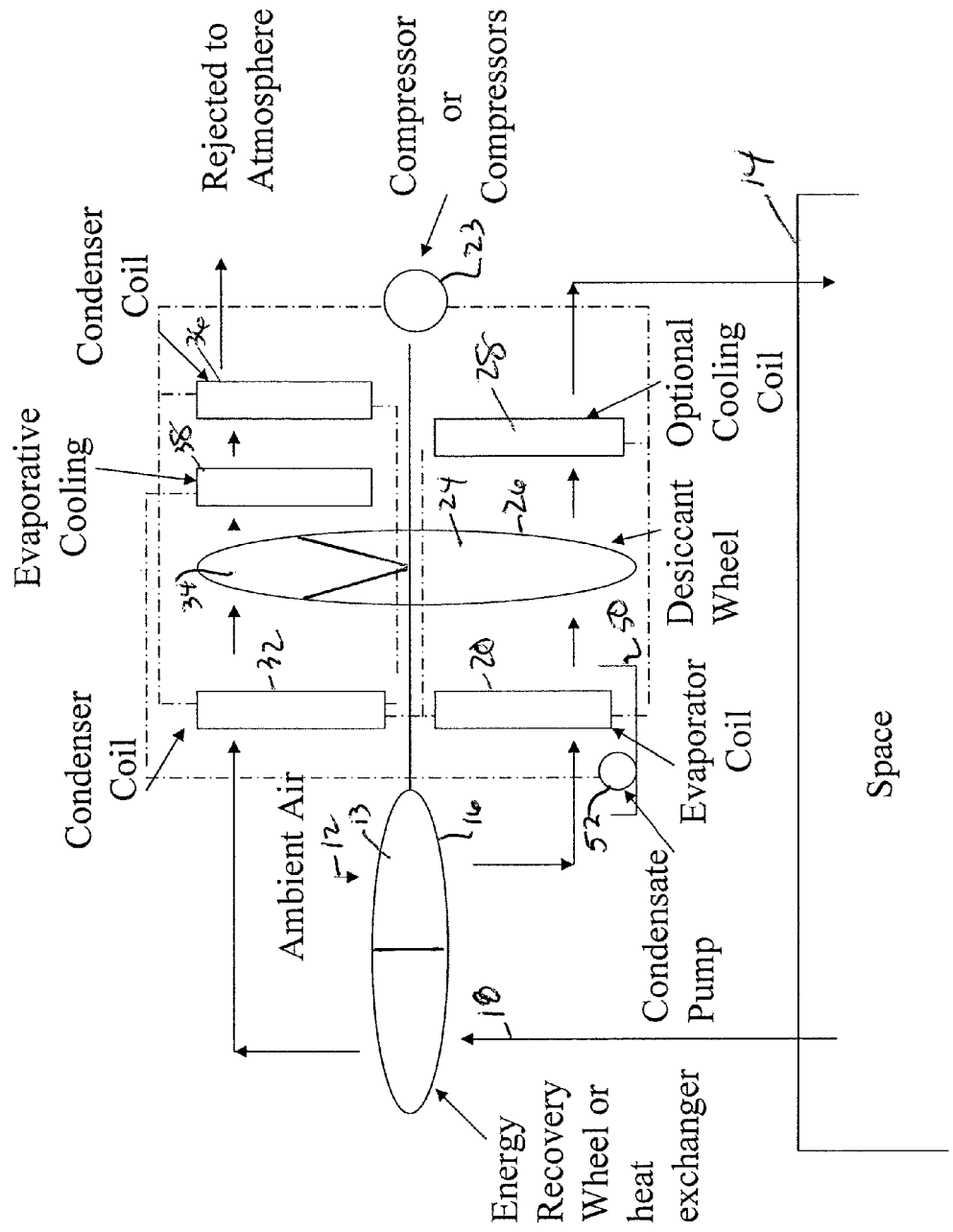
FIG. 15 is a schematic illustration of a sixth embodiment of the invention.

FIG. 15 is another embodiment of the invention as shown in FIG. 10, again with similar parts identified with the same reference numerals.

In this embodiment the condensate from evaporator coil 20 is recovered in a sump 50 or the like and supplied to the evaporative cooler by a pump 52. Recovering the condensate for evaporative cooling requirements allows for increased efficiency without the need for make up water. This will also achieve lower water usage costs and lower installation cost.

Figure 16:
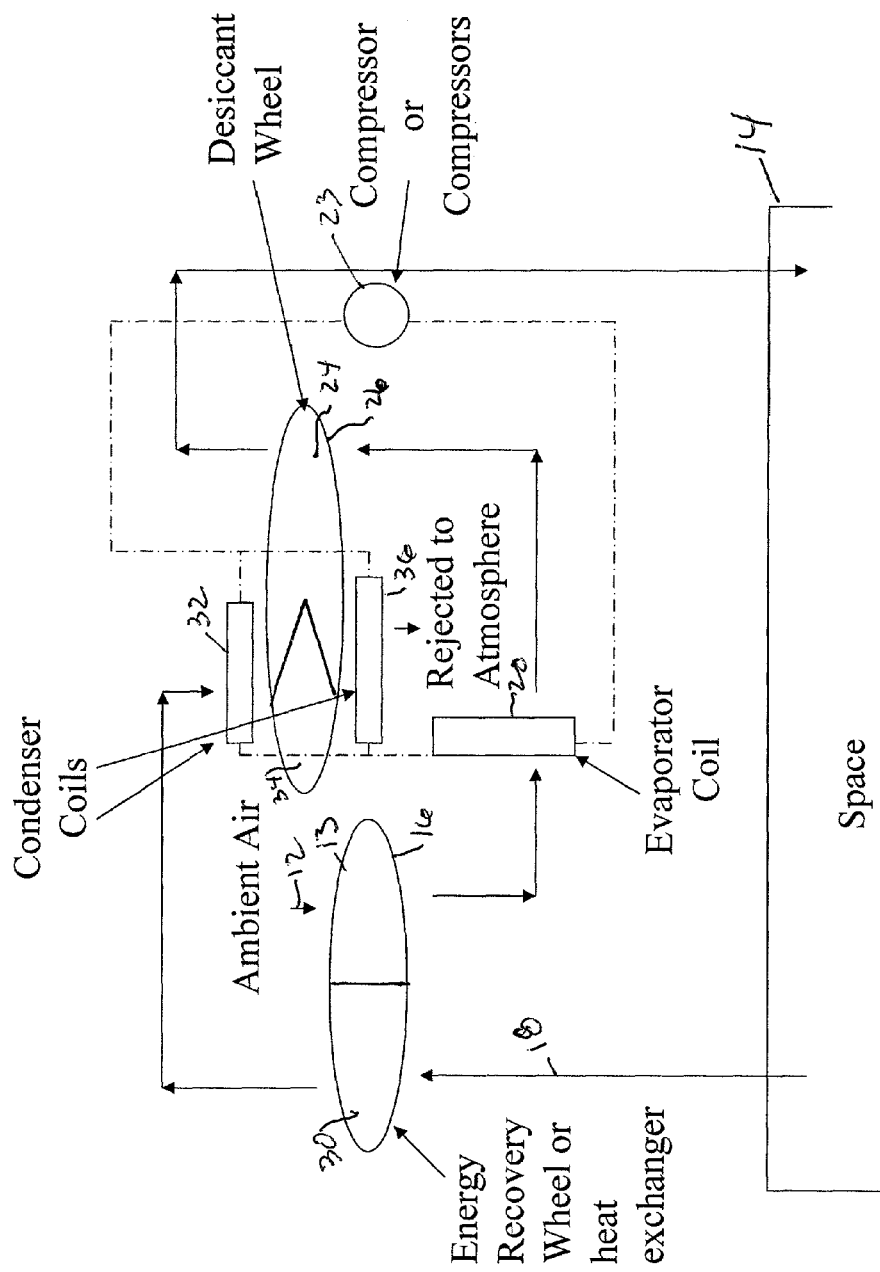
FIG. 16 is a schematic illustration of a seventh embodiment of the invention.

FIG. 16 is yet another variant on the invention as described above with respect to FIG. 7. In this embodiment the configuration of the duct work relative to the desiccant wheel is rearranged so that the ambient/supply air stream flows through the desiccant wheel in a direction opposite to the flow of the exhaust/regeneration air stream rather than in the same direction shown in FIG. 7. This counter flow arrangement provides greater desiccant performance for greater efficiency. The physical layout of this arrangement is more difficult to build than the other embodiments and potentially would require more cost. All other previous indicated embodiments shown in the other figures can also be added to this embodiment to provide many options and variations of the present invention.

Although illustrative embodiments of the present invention have been described herein with reference to the accompanying drawings, it is to be understood that the invention is not limited to those precise embodiments, but that various changes and modifications can be effected therein by those skilled in the art without departing from the scope or spirit of this invention.

What is claimed is:

1. A method for supplying conditioned air to an enclosure comprising the steps of:
   a) conditioning an ambient air stream by:
      i) first cooling the ambient supply air stream to a first reduced temperature in an energy recovery device;
      ii) then passing the cooled ambient supply air stream through a refrigeration system cooling coil to reduce the temperature of the ambient air supply stream to a second reduced temperature;
      iii) thereafter dehumidifying the thus cooled ambient supply air stream in a desiccant dehumidification device; and
      iv) delivering the thus cooled and dried air to an enclosure; while
   b) conditioning and using an exhaust air stream from an enclosure by:
      i) first increasing the temperature of the exhaust air stream by passing it through said energy recovery device,
      ii) then passing the exhaust air stream at said increased temperature over a condenser coil of the refrigeration system to raise its temperature and decrease its relative humidity;
      iii) thereafter passing the heated exhaust air stream through a regeneration portion of the desiccant dehumidification device to regenerate the desiccant device, and lower the temperature and increase the moisture content of the exhaust air stream; and
      iv) then exhausting the exhaust air stream to the atmosphere.

2. The method as defined in claim 1 including the step of passing the exhaust air stream from the desiccant device over a second condenser coil to further increase its temperature before exhausting the exhaust air stream to the atmosphere.

3. The method as defined in claim 1 wherein said step of conditioning an ambient air stream includes the step of reducing the moisture content of the ambient air stream while cooling the ambient air stream to said first reduced temperature in said energy recovery device.

4. The method as defined in claim 1 wherein said step of conditioning an ambient air stream includes the step of reducing the moisture content of the ambient air stream while passing it through the refrigeration cooling coil.

5. The method as defined in claim 1 wherein said step of conditioning the exhaust air stream includes the step of reducing the moisture content of the exhaust air stream while increasing its temperature before passing it over a condenser coil of a refrigeration system.

6. The method as described in any one of claims 1-5 including the step of providing additional evaporative cooling in the exhaust air stream between the desiccant device and the second condenser coil.

7. The method as described in any one of claims 1-5 including the steps of using a desiccant wheel dehumidification device and selectively changing the speed of rotation of the desiccant wheel device to modulate the desiccant effect on the air stream to provide capacity control.

8. The method as described in any one of claims 1-5 including the step of selectively bypassing a portion of the supply air stream around the desiccant device to modulate the desiccant effect on the air stream.

9. The method of any of claims 1-5 including the step of selectively bypassing a portion of the exhaust air stream around the desiccant device to modulate the desiccant effect on the air stream.

10. The method of any of claims 1-5 including the step of selectively bypassing a portion of both the supply and exhaust air streams around the desiccant device to modulate the desiccant effect on the air stream.

11. The method of claim 6 including the step of recovering condensate from a cooling coil and pumping said condensate to the evaporative cooling device to allow for evaporative cooling effect.

12. The method as described in any of claims 1-5 including the step of providing additional cooling to the supply air after it passes through the desiccant dehumidification device to provide cooling capacity to the enclosure.

13. The method as described in any of claims 1-5 including the step of passing said ambient and exhaust air streams through said desiccant device in opposite directions.

14. A method for supplying conditioned air to an enclosure comprising the steps of:
    a) conditioning an ambient air stream by:
       i) first cooling the ambient supply air stream in an energy recovery device to reduce its temperature and moisture content;
       ii) then passing the cooled and dried ambient air through a refrigeration system cooling coil to further reduce the temperature and moisture content of the ambient air to a predetermined condition,
       iii) thereafter passing the ambient supply air stream through a segment of a desiccant dehumidification device to increase its temperature and decrease its moisture content;
       iv) then delivering the thus treated ambient air to said enclosure; and
    b) simultaneously conditioning and using an exhaust air stream from an enclosure, by:
       i) first passing the exhaust air stream through said energy recovery device to increase its temperature and moisture content,
       ii) then passing the exhaust air over a condenser coil in said refrigeration system to raise its temperature while decreasing its relative humidity,
       iii) thereafter passing the thus heated exhaust air through another segment of said desiccant dehumidification device to regenerate the desiccant device and lower the temperature and increase the moisture content of the exhaust air stream; and
       iv) then exhausting the exhaust air stream to the atmosphere.

15. The method as described in claim 14 including the step of passing the exhaust air stream over a second condenser coil to further increase its temperature before exhausting the exhaust air stream to the atmosphere.

16. The method as described in claim 14 including the step of providing additional evaporative cooling in the exhaust air stream between the desiccant device and the second condenser coil.

17. The method as described in claim 14 including the steps of using a desiccant wheel dehumidification device and selectively changing the speed of rotation of the desiccant wheel device to modulate the desiccant effect on the air stream to provide capacity control.

18. The method as described in claim 14 including the step of selectively bypassing a portion of the supply air stream around the desiccant device to modulate the desiccant effect on the air stream.

19. The method of claim 14 including the step of selectively bypassing a portion of the exhaust air stream around the desiccant device to modulate the desiccant effect on the air stream.

20. The method of claim 14 including the step of selectively bypassing a portion of both the supply and exhaust air streams around the desiccant device to modulate the desiccant effect on the air stream.

21. The method of claim 14 including the step of recovering condensate from a cooling coil and pumping said condensate to the evaporative cooling device to allow for evaporative cooling effect.

22. The method as described in claim 14 including the step of providing additional cooling to the supply air after it passes through the dehumidification desiccant device to provide cooling capacity to the enclosure.

23. The method as described in claim 14 including the step of passing said ambient and exhaust air streams through said desiccant device in opposite directions.

24. A method for supplying conditioned air to an enclosure comprising the steps of:
   a) conditioning an ambient air having a temperature in the range of about 60° F. to about 105° F. and a moisture content of between 70 to 180 grains per pound by:
      i) first supplying said ambient air stream to an energy recovery device to reduce the temperature and moisture content of the ambient air stream,
      ii) then passing the cooled and dried ambient air through a refrigeration system cooling coil to further reduce the temperature and moisture content of the ambient air to a predetermined condition,
      iii) thereafter passing the air through a segment of a desiccant dehumidification device to increase its temperature to a predetermined temperature range of about 70° F. to about 85° F. and decreasing its moisture content to about 45 to 65 grains per pound, and
      iv) then delivering the thus treated air to said enclosure; and
   b) simultaneously conditioning and using an exhaust air stream from an enclosure by:
      i) exhausting air from the enclosure,
      ii) then first passing the exhausted air through said energy recovery device to increase its temperature and moisture content,
      iii) thereafter passing the exhaust air over a condenser coil in said refrigeration system to raise its temperature while decreasing its relative humidity,
      iv) then passing the thus heated exhaust air through another segment of said desiccant dehumidification device to regenerate the desiccant device and lower the temperature and increase the moisture content of the exhaust air stream; and
      v) then exhausting the exhausted air stream to the atmosphere.

25. The method as described in 24 including the step of passing the exhaust air stream over a second condenser coil to further increase its temperature before the exhaust air is exhausted to the atmosphere.

26. The method as described in claim 24 including the step of providing additional evaporative cooling in the exhaust air stream between the desiccant device and the second condenser coil.

27. The method as described in claim 24 including the steps of using a desiccant wheel dehumidification device and selectively changing the speed of rotation of the desiccant device to modulate the desiccant effect on the air stream to provide capacity control.

28. The method as described in claim 24 including the step of selectively bypassing a portion of the supply air stream around the desiccant device to modulate the desiccant effect on the air stream.

29. The method of claim 24 including the step of selectively bypassing a portion of the exhaust air stream around the desiccant device to modulate the desiccant effect on the air stream.

30. The method of claim 24 including the step of selectively bypassing a portion of both the supply and exhaust air streams around the desiccant device to modulate the desiccant effect on the air stream.

31. The method of claim 26 including the step of recovering condensate from a cooling coil and pumping said condensate to the evaporative cooling device to allow for evaporative cooling effect.

32. The method as described in claim 24 including the step of providing additional cooling to the supply air after it passes through the dehumidification desiccant device to provide cooling capacity to the enclosure.

33. The method as described in claim 24 including the step of passing said ambient and exhaust air streams through said desiccant device in opposite directions.

34. A device for supplying conditioned air to an enclosure comprising:
   means for recovering thermal energy from an ambient supply air stream to cool the supply air stream to a first reduced temperature;
   a refrigeration system including an evaporator coil for receiving the supply air stream from the thermal energy recovery means to reduce the temperature of the supply air stream to a second reduced temperature;
   desiccant means for dehumidifying the cooled ambient supply air stream from the evaporator coil; and
   means for delivering the thus cooled and dried air to an enclosure;
   said means for recovering thermal energy from an ambient air stream being adapted to receive and increase the temperature of an exhaust air stream from an enclosure;
   said refrigeration system including a condenser coil for receiving the exhaust air stream from said thermal energy recovery means and raising its temperature and decreasing its relative humidity; and
   said desiccant dehumidifying means including a regeneration portion for receiving exhaust air from said condenser coil for regenerating the desiccant device, and lowering the temperature and increasing the moisture content of the exhaust air stream.

35. The device as defined in claim 34 wherein said refrigeration system includes a second condenser coil for receiving the exhaust air stream from the desiccant dehumidifying means to further increase its temperature.

36. The device as defined in claim 35 wherein said means for recovering thermal energy reduces the moisture content of the ambient air stream while cooling the ambient air stream to said first reduced temperature.

37. The device as defined in claim 35 wherein said evaporator coil of the refrigeration system condenses moisture in the supply air stream to reduce the moisture content of the ambient air stream.

38. The device as defined in claim 35 wherein said means for recovering thermal energy increases the moisture content of the exhaust air stream while increasing its temperature.

39. The device as defined in any one of claims 35-38 including evaporative cooling means in the exhaust air stream between the desiccant dehumidifying means and the second condenser coil.

40. The device as described in any one of claims 35-38 wherein said desiccant dehumidifying means is a desiccant wheel dehumidification device.

41. The device as described in claim 40 including means for selectively changing the speed of rotation of the desiccant wheel device to modulate the desiccant effect on the air stream to provide capacity control.

42. The device as described in any one of claims 35-38 including means for selectively bypassing a portion of the supply air stream around the desiccant device to modulate the desiccant effect on the air stream.

43. The device of any of claims 35-38 including means for selectively bypassing a portion of the exhaust air stream around the desiccant device to modulate the desiccant effect on the air stream.

44. The device of any of claims 35-38 including means for selectively bypassing a portion of both the supply and exhaust air streams around the desiccant device to modulate the desiccant effect on the air stream.

45. The device of claim 39 including means for recovering condensate from a cooling coil and pumping said condensate to the evaporative cooling device to allow for evaporative cooling effect.

46. The device as described in any of claims 35-38 including means for providing additional cooling to the supply air after it passes through the desiccant dehumidification device to provide cooling capacity to the enclosure.

* * * * *